United States Patent Office 3,582,255
Patented June 1, 1971

3,582,255
PROCESS FOR STRIPPING DYEINGS AND PRINTS FROM HYDROPHOBIC FIBRES
Bruno Kissling, Riehen, Basel-Stadt, Switzerland, assignor to Sandoz Ltd. (also known as Sandoz A.G.), Basel, Switzerland
No Drawing. Filed May 16, 1968, Ser. No. 729,498
Claims priority, application Switzerland, May 26, 1967, 7,487/67
Int. Cl. D06l 3/00
U.S. Cl. 8—102
14 Claims

ABSTRACT OF THE DISCLOSURE

A process for stripping dyeings or prints produced with non-fibre-reactive disperse dyes on hydrophobic fibres, which process consists in treating the dyed fibres at temperatures above 90° C. with an amount of at least 0.5% (on the weight of the dyed fibres) of a non-ionic compound of the polyglycol ether series which is soluble to at least 3% in water at 20° C. and which contains per polyglycol ether chain 1 hydrophobic radical having 12 to 26 carbon atoms.

---

This invention relates to a process for stripping dyeings or prints of non-fibre-reactive disperse dyes from hydrophobic fibres, which process consists of treating the dyed fibres with non-ionic compounds of the polygylcol ether series in an amount of at least 0.5% on the weight of dyed fibres and at temperatures above 90° C. The compounds of the polygylcol ether series employed have a water solubility of at least 3% at 20° C. and contain per polygylcol ether chain one hydrophobic radical having 12 to 26 carbon atoms.

All dyed hydrophobic, fully synthetic or semi-synthetic organic fibres can be stripped of dye by this process. They include the aromatic polyester fibres, e.g. polyethylene terephthalate or condensation products of terephthalic acid and 1,4-bis-(hydroxymethyl)-cyclohexane; the polyamide fibres, e.g. the nylon fibres listed on pages 8 and 9 of the S.F.V. Fachorgan 15 (1960), the polyurethane fibres, e.g. the condensation products of 1,4-butanediol and hexamethylene-1,6-diisocyanate, the polyacrylonitrile fibres, e.g. polyacrylonitrile itself and the copolymers of acrylonitrile and vinyl chloride, vinyl acetate or vinyl-pyridine; the polyvinyl chloride fibres; the cellulose ester fibres, e.g. cellulose triacetate and cellulose tri-aceto-propionate; and the polyolefine fibres, e.g. polypropylene.

The dyed fibres may be in the form of filament, loose fibre, tops, slivers or fabric, and may be present individually or in blends with each other or with animal fibres. such as wool, e.g. polyester/wool, with vegetable fibres, e.g. cotton or linen, with regenerated cellulose fibres, e.g. viscose rayon, or with the modified regenerated cellulose fibres known as polynosic fibres which have high wet resistance and tenacity.

Dyeings or prints produced with any non-fibre-reactive disperse dyes, for example with the dyes described in the literature references cited on page 2 of Swiss Patent 386,982, or with the alkali-unstable disperse dyes disclosed in British Patents 843,643, 841,927, 800,200 and 606,008, can be stripped.

The disperse dyes can belong, e.g., to the monoazo, disazo, nitro styrl, quinophthalone, anthraquinone or naphthazarine series suitable examples being:

(1) 4-benzoylamino-2'-hydroxy-5'-methyl-1,1'-azobenzene- (yellow)
(2) 1-phenyl-3-methyl-4-phenylazo-5-pyrazolone yellow)
(3) 2,6-dichloro-4-nitro-4-'-N-β-cyanethyl-N-β acetoxyethylamino-1,1'-azobenzene (yellow brown)
(4) 2-methylsulphonyl-4-nitro-2'-methyl-4'-N-ethyl-N-β-cyanethyl-amino-1,1-'-azobenzene (ruby red)
(5) 2-chloro-6-cyano-4-nitro-2'-acetylamino-4-N,N-bis-β-(acetoxyethyl)-amino-1,1'-azobenzene (blue violet)
(6) 2-bromo-4,6-dinitro-2'-acetylamino-4'-N,N-bis-β-acetoxyethyl)-amino-5'-ethoxy-1,1'-azobenzene (reddish navy)
(7) 4-hydroxy-4'-phenylazo-1,1'-azobenzene (reddish yellow)
(8) 4-hydroxy-2',5'-dimethoxy-4'-phenylazo-1,1'-azobenzene (orange)
(9) 2-nitro-1,1'-diphenylamine-4-sulphonic acid-phenylamide (yellow)
(10) 4-nitro-9-acridone (yellow)
(11) The yellow dye of the formula

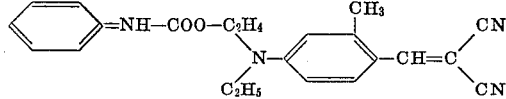

(12) The yellow dye of the formula

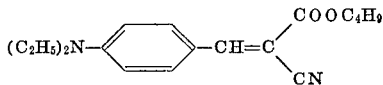

(13) The yellow dye of the formula

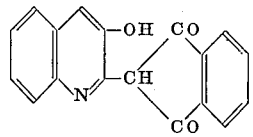

(14) 5-benzoylamino-1,9-thiazolanthrone (yellow)
(15) 1-amino-2-phenoxy-4-hydroxy-anthraquinone (bluish red)
(16) 1,4-diamino-2,3-dichloro-anthraquinone (bluish violet)
(17) 1-hydroxy-4-(2'-ethoxycarbonyl-ethylamino)-anthraquinone (violet)
(18) 1,4-diamino-anthraquinone-2,3-dicarboxylic acid-(β-ethoxy-ethylimide) (turquoise blue)
(19) 1,5-dihydroxy-4-nitro-8-phenylaminoanthraquinone (blue)
(20) The blue dye of the formula

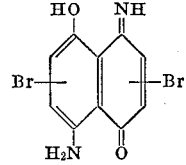

(Canadian Textile Journal Vol. 76, No. 9, May 1, 1959 page 58)

Examples of suitable non-ionic compounds of the polyglycol ether series are adducts of butylene oxide, propylene oxide or, preferably, ethylene oxide on a hydrophobic compound having 12 to 26 carbon atoms. The hydrophobic compound may be aliphatic, saturated or unsaturated and/or branched, e.g. a fatty acid having 12 to 22 carbon atoms, such as lauric acid, palmitic acid, stearic acid, arachidic acid, behenic acid or oleic acid; an amide derivative of such an acid, such as stearic acid amide or oleic acid amide; an alcohol, e.g. a fatty alcohol, such as lauryl alcohol, myristyl alcohol, cetyl alcohol, stearyl alcohol, arachidyl alcohol, behenyl alcohol; or oleyl alcohol, or a snythetic alcohol, such as 2,6,8-trimethyl-4-nonanol, tetramethylnonanol prepared from tetrapropylene by the oxo-synthesis; an amine, e.g. a fatty amine, such as lauryl amine, cetyl amine, stearyl amine, arachidyl amine, behenyl amine or oleyl amine, or a synthetic monoamine or diamine, such as 3-lauryloxypropyl-amine, 3-oleyloxy-2-hydroxypropylamine, 3-stearylamino-propylamine, 3-behenylamino-propylamine; or a thiole compound, e.g. a synthetic thiole compound having 12 to 22 carbon atoms, such as tert. dodecyl mercaptan; it may also be a mono-alkylphenol, dialkyl-phenol, mono-alkyl-naphthol or dialkyl-napthol having in all 12 to 26 carbon atoms, such as sec. or tert. octylphenol, sec. or tert. nonylphenol, dodecylphenol, di-(isoamyl)-phenol, dioctyl-phenol, dinonyl-phenol, heptylnaphthol, dihexyl-naphthol, or an oil bearing hydroxyl groups, such as castor oil. Examples of such compounds are described in N. Schoenfeldt, "Oberflächenaktive Addukte des Aethyl-en-oxids" (1959).

The number of ethylene oxide groups must be at least great enough to render the polyglycol ether soluble in water at 20° C. to at least 3%. For a hydrophobic compound, such as lauryl alcohol, the number of ethylene oxide groups is about 5 to 6; for nonylphenol, about 8. The maximum number is about 100–120 per hydrophobic radical.

The terminal hydroxyl group of the polyglycol ethers may be replaced by an alkoxy group (methoxy, ethoxy), an arylalkoxy group (benzyloxy) or a carboxyalkoxy group ($HOOC-CH_2-O-$, $HOOC-CH_2-CH_2-O-$).

Examples of some suitable polyglycol ethers are:

(A) lauryl octaglycol ethers,
(B) tridecyl-$(O-C_2H_4)_8$—OH,
(C) 2,6,8-trimethyl-4-nonyl$(OC_2H_4)_6$—OH,
(D) cetyl-$(OC_2H_4)_{12}$—OH,
(E) oleyl-$O-C_2H_4)_{12}$—OH,
(F) stearyl-$(O-C_2H_4)_{25}$—OH,
(G) octylphenyl-$(OC_2H_4)_{20}$—OH,
(H) octylpenyl-$(O-C_2H_4)_{10}$—OH,
(I) nonylphenyl-$(OC_2H_4)_{7.5}$—OH,
(K) nonylphenyl-$(OC_2H_4)_{9-10}$—OH,
(L) di(isoamyl)-phenyl-$(OC_2H_4)_{12}$—OH,
(M) dioctyl-phenyl-$(OC_2H_4)_{40}$—OH,
(N) dinonyl-phenyl-$(OC_2H_4)_{20}$—OH,
(O) $n$-$C_{17}H_{35}$—CO—$NH_2$+12$(C_2H_4O)$
(P) tert. dodecylmercaptan+10 $(C_2H_4O)$
(Q) oleyl-$(OC_2H_4)_{15}$—O—$CH_2$—COOH as the sodium salt.

In the polyglycol ether B tridecyl represents the radical of tetramethyl-nonanol obtained from tetrapropylene by the oxo-synthesis.

The preferred polyglycol ethers are the adducts of about 8 to 100 moles of ethylene oxide on unsaturated alcohols, such as oleyl alcohol or on unsaturated acids, such as oleic acid, e.g. the oleyl polyglycol ethers having 20 to 60 $C_2H_4O$ groups, such as oleyl-

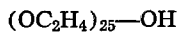
$(OC_2H_4)_{25}$—OH (R), oleyl-$(OC_2H_4)_{40}$—OH (S) and oleyl-

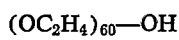
$(OC_2H_4)_{60}$—OH (T), and the oleoyl polyglycol ethers having 8 to 50 $C_2H_4O$ groups, such as oleoyl-$(OC_2H_4)_{13}$—OH (U); further the adducts of 25 to 200 moles of ethylene oxide on 1 mole of castor oil, e.g. castor oil+32 $(C_2H_4O)$ (V), castor oil+40 $(C_2H_4O)$ (W), castor oil+46 $(C_2H_4O)$ (X) and castor oil+110 $(C_2H_4O)$ (Y). These castor oil derivatives are triglycerides and each contains 3 hydrophobic unsaturated radicals, each of which has 18 carbon atoms, plus 3 polyglycol ether chains, each of which has 8 to about 70 ethylene oxide groups.

The amount of the non-ionic compound or compounds, since mixtures are generally employed, is calculated in relation to the weight of the hydrophobic fibres to be stripped, a point to be specially noted with blend fabrics and in printing. The amount may be 0.5% to 40% or preferably 1% to 35% on the weight of the dyed fibres.

The non-ionic compounds are applied from aqueous liquors at goods-to-liquor ratios of 1:3 to 1:100 or preferably 1:10 to 1:50. The fibres are treated in the liquor at temperatures above 90° C., e.g. at 90–100° C. at atmospheric pressure or at 120–140° C. at superatmospheric pressure. In these two methods of application the amount of polyglycol ether employed is advantageously 2.5% to 25% on the weight of the dyed fibres.

The dyed fibres can be padded or sprayed with an aqueous solution of the non-ionic compounds at low or slightly increased temperature, e.g. 15–50° C., and then with or without intermediate drying, treated at temperatures above 160° C., e.g. 180–230° C. Not only dilute but also concentrated aqueous solutions of the non-ionic compounds are suitable for spraying, and even the non-ionic compounds themselves, provided they are of sufficiently thin consistency. In this second method of application the amount of the non-ionic compounds used is preferably 2% to 20% of the weight of the dyed fibres. Their concentrations in padding liquors and in aqueous liquors vary in inverse ratio to the expression or pick-up on the padding machine or to the liquor ratio. The time of treatment is shorter the higher the temperature; it is for instance at least 1 minute, or preferably 2–5 minutes, at 180–230° C., at least 10 minutes, or preferably 20–30 minutes, at 120–140° C., and at least 30 minutes, or preferably 40–120 minutes, at 90–100° C.

On completion of the treatment the dyeings or prints are rinsed and dried if the treatment is carried out in aqueous medium; if the treatment has been effected at temperatures above 160° C. a wash process with water alone is interpolated to remove the stripped dye or dyes from the fibre. The desired degree of stripping of the dyeing or print can be obtained by varying the amount and type of the non-ionic compounds employed and by varying the time and temperature of treatment. By these means it is possible to lighten dyeings or prints to any desired degree, e.g. from 5% to almost 100%. In order to obtain a reduction in depth of, for instance, 5% to 50% a small amount of the selected polyglycol ether, e.g. up to about 5%, is generally sufficient, whereas, for stripping to 70% or up to practically 100%, amounts of 5% to 40% are required. Amounts of about 15% to 40% of the preferred oleyl polyglycol ethers and castor oil polyglycol ethers, applied by the thermosol process at 180–230° C., are capable of completely stripping the dyed fibres.

The polyglycol ether can be employed singly or in mixture with other surface active compounds. Examples of suitable compounds of the latter type are polyethylene glycols, such as the adducts of, e.g., 3 to 14 moles of ethylene oxide on ethylene glycol (polyethylene glycols with average molecular weights of 200, 300, 400 or 600); anionic compounds, such as aromatic sulphonic acids, e.g. alkylaryl-sulphonic acids (mono- and poly-alkylbenzenesulphonic acids, mono- and poly-alkylnaphthalene-sulphonic acids, preferably those having in all 18 to 21 carbon atoms) and dinaphthylmethanedisulphonic acid. Other suitable anionic compounds are the products obtained by condensing, e.g., the polyglycol ethers conforming to this invention with the salts of halogenalkanecar-boxylic acids, such as halogenoacetic acids, β-halogeno-propionic acids or with the salts of alkenecarboxylic acids, such as acrylic acid. The aforenamed anionic compounds are employed preferably as alkali metal or ammonium salts.

Polyglycol ethers bearing one terminal carboxy-alkyl group may partially or wholly replace the polyglycol ethers of the present invention, since as previously stated they have the same stripping action. Polyethylene glycols and the salts of aromatic sulphonic acids, which as such have very little or no stripping action, are used with advantage in amounts of about 15% to 35%, or preferably 20–30%, of the mixture with the polyglycol ether. With such mixtures the results are equally as good as with the same amount of a polyglycol ether alone. The results are often even better, that is to say, the stripped dyeing is whiter than one stripped with polyglycol ether alone, or stripping takes place more rapidly, e.g. after only 1 minute instead of after 2 minutes when treatment is carried out at 180–230° C.

The stripped dyeings or prints may be processed further as they are, or alternatively they may be re-dyed with the same or different disperse dyes to the correct depth or shade. Dyeings showing unlevelness or other faults can be corrected by stripping to much lighter depth and re-dyeing to the desired depth.

The present stripping process has many advantages over the use of carriers:

(1) In relatively small amounts the polyglycol ethers exercise a pronounced stripping effect;

(2) They are virtually non-volatile and are almost odourless even at the highest application temperatures, in contrast to the liquid volatile carriers, such as polychlorobenzenes and methyl anthranilate;

(3) They have no effect on the light fastness of the stripped dyeings and prints, in contrast to 2- or 4-hydroxy-1,1'-diphenyl;

(4) And when applied at temperatures above 160° C. they can be completely removed with the stripped dye by washing off with water, again in contrast to 1,1'-diphenyl, 2-hydroxy and 4-hydroxy-1,1'-diphenyl.

In the following examples the parts and percentages are by weight and the temperatures in degrees centigrade.

EXAMPLE 1

An intimately blended fabric of 67% polyester fibre of polyethylene terephthalate and 33% cotton for rainwear, dyed with 1% of the dye (6) is padded with a solution of 50 g./l. of the polyglycol ether I, expressed to retain 70% of its weight of the solution, dried at 130° and exposed on a stenter for 2 minutes to dry air at 220°. The fabric is then washed off with hot water only on the open width washing machine and finally dried. The reduction in depth of the original navy blue dyeing is approximately 50%. This lighter dyeing can be re-dyed with any desired disperse dye by the conventional exhaustion method or the thermosol process, or corrected in shade or depth as required.

EXAMPLE 2

A poplin fabric of 100% polyester fibre (polyethylene terephthalate) dyed with 0.8% of brominated 1,5-diamino-4,8-dihydroxyanthraquinone (21) is padded with an aqueous solution of 20 g./l. of the polyglycol ether E, expressed to 60% pick-up, dried and dry heat treated for 2½ minutes at 215°, after which it is washed off with hot water and dried on a hot flue. The stripping effect is about 70% and the stripped light blue dyeing can be re-dyed without difficulty. Appreciable stripping can also be obtained by using one of the polyglycol ethers (A) to (D) or (F) to (P) in place of (E).

EXAMPLE 3

100 parts of a polyethylene terephthalate yarn dyed in package form with 0.7% of the yellow dye (7) are treated for 30 minutes at 130° in 2000 parts of a solution containing 4 parts of the polyglycol ether (A). The treatment is followed by rinsing and drying. The treated dyeing is at least 50% lighter in depth than the original dyeing and can be re-dyed to the desired depth with an appropriate amount of dye. Aftertreatment of the polyester dyeing with the polyglycol ether (A) in contrast to the normally used carriers, does not create an unpleasant odour and any residue of assistant in the fibre does not reduce the light fastness of the dyeing.

EXAMPLE 4

100 parts of a fabric of polyacrylonitrile dyed with 1% of the blue dye 1-methylamino-4-(2'-hydroxyethylamino)-anthraquinone (22) are treated for 1 hour at 98–100° in 4000 parts of a liquor containing 20 parts of polyglycol ether (L), with subsequent rinsing and drying. The dyeing is stripped to a very much lighter depth and can be re-dyed and/or corrected to the desired depth with the required amount of dye.

In contrast to normal carriers, such as chlorinated benzenes, treatment of dyeings on polyacrylonitrile fibres with polyglycol ether (L) or one of the polyglycol ethers (A) to (K) or (M) to (Y) does not produce an unpleasant odour and does not adversely affect the fastness properties of the dyeings in any way. Very good stripping results are obtained when the aforedescribed treatment is applied to dyeings produced with the following dyes:

The orange dye (8).

(23) 1-amino-2-[2'-(2"-ethoxy-ethoxy)-ethoxy]-4-hydroxyanthraquinone (red)
(24) 4-nitro-4'-N,N-bis-(acetoxyethyl)-amino-2'-propionylamino-1,1'-azobenzene (scarlet)

EXAMPLE 5

100 parts of a polyethylene terephthalate fabric dyed with 0.6% of the dye (8) are treated for 45 minutes at 98–100° in 5000 parts of a liquor containing 25 parts of the polyglycol ether (L), and then rinsed and dried. Thus treated, the dyeing is about 30% lighter in depth than it originally was.

In contrast to chlorinated benzenes, no unpleasant odour occurs in the treatment of polyester dyeings with the polyglycol ether (L) or with one of the polyglycol ethers (A) to (K) or (M) to (Y) and the fastness properties of the dyeings are not adversely affected. Comparable stripping results are obtained with the aforedescribed treatment on polyester materials dyed with dyes (7), (23) or (24) or with a mixture of equal parts of the dyes 1,5-dihydroxy-4,8-diamino-2 - (4'-hydroxyphenyl)-anthraquinone and 1,5-dihydroxy-4,8-diamino-2-(4'-ethoxyphenyl)-anthraquinone (25).

EXAMPLE 6

A cellulose triacetate fabric dyed with 1% of the red dye 4-nitro-4'-N-ethyl-N-β-hydroxyethylamino-1,1-azobenzene (26) is padded with a solution of 200 g./l. of the polyglycol ether (V) at 18–20°, rinsed with hot and cold water and dried. The dyeing is stripped to 80%. Equally good stripping results are obtained when dyeings of the dyes (7), (23) or (25) are treated in the aforestated manner, or one of the polyglycol ethers (W), (X) or (Y) is used.

EXAMPLE 7

A polyamide 66 fabric dyed with 1% of dye (26) is treated as described in Example 6. The dyeing is stripped to practically 100%. When the dyeing on polyamide 66 fabric is replaced by a dyeing on polyamide 6 fabric and the treatment is carried out for 1 minute at 180°, the dyeing is stripped to about 90%, i.e. only about 10% of the dye is left on the fabric.

A very good stripping effect is also obtained on goods dyed with the yellow-brown dye (3) or with the dyes (8), (23) or (25).

EXAMPLE 8

A polyester fabric dyed with 1% of the navy blue dye (6) is padded at room temperature with an aqueous solution of 200 g./l. of the polyglycol ether dinonylphenyl-dodecaglycol ether (Z) and expressed to a pick-up of 70%, after which it is exposed to dry heat at 220° for 2 minutes, rinsed with hot and cold water and dried. The degree of stripping is about 75–80%, i.e. about 20–25% of the original dye is left on the fabric.

Very similar results are obtained when this treatment is applied to dyeings on the types of polyester fibre that are produced by condensation of terephthalic acid with 1,4-bis-(hydroxymethyl)-cyclohexane.

The following polyglycol ethers show very similar behaviour:

dinonylphenyl pentadecaglycol ether=(A) (A)
stearic acid+16 $C_2H_4O$=(A) (B)
stearic acid+26 $C_2H_4O$=(A) (C)
stearic acid amide+22 $C_2H_4O$=(A) (D)
stearic acid amine+29.5 $C_2H_4O$=(A) (E)
polyglycol ether (H)
polyglycol ether (K)
polyglycol ether (L)

The following polyglycol ethers have a stripping effect of about 60%:

stearic acid+6.2 $C_2H_4O$=(A) (F)
stearic acid+10 $C_2H_4O$=(A) (G)
polyglycol ether (C)
polyglycol ether (I)

and the following polyglycol ethers a stripping effect of about 90%:

oleic acid+6.3 $C_2H_4O$=(A) (H)
stearic acid+40 $C_2H_4O$=(A) (I)
polyglycol ether (M)
polyglycol ether (N)

The stripping effect of the following polyglycol ethers is given in brackets as a percentage of the original dyeing:

polyglycol ether (O) (97%)
polyglycol ether (Q) (98%)

Very similar results are obtained when polyester dyeings produced with the following dyes are employed:

the yellow dye (9)

(27) 2-chloro-4-nitro-4'-N-β-cyanethyl-N-β-acetoxy-ethylamino-1,1'-azobenzene (scarlet)
(28) 2-cyano-4-nitro-4'-N-β-cyanethyl-N-β-acetoxy-ethylamino-1,1'-azobenzene (red)
(29) 2-cyano-4-nitro-4'-N-β-ethyl-N-cyanethylamino-1,1'-azobenzene (bluish red)
(30) 2-chloro-4-nitro-2'-acetylamino-4'-N,N-bis-(β-acetoxyethyl)-amino-1,1'-azobenzene (ruby red)

EXAMPLES 9–106

Dyeings of dye (6) on polyester fabric (polyethylene terephthalate) in 1% depth are padded at 18–20° with aqueous solutions containing varying amounts of the polyglycol ethers listed in the following table, or a mixture of a polyglycol ether and another surface active compound. The padded fabric is expressed to retain 70% of its weight of liquor and is treated in dry heat at 220°, rinsed and dried.

TABLE

| Example No. | Polyglycolether | Amount, g./l. | Second addition | Amount, g./l. | Time of dry heat treatment, min. | Stripping effect, percent |
|---|---|---|---|---|---|---|
| 9 | AH | 125 | | | 2 | 80 |
| 10 | AH | 200 | | | 2 | 90 |
| 11 | AK | 125 | | | 2 | 97 |
| 12 | AK | 200 | | | 2 | 99 |
| 13 | U | 125 | | | 2 | 95 |
| 14 | U | 200 | | | 2 | 99 |
| 15 | W | 125 | | | 2 | 95 |
| 16 | W | 200 | | | 2 | 99 |
| 17 | X | 200 | | | 2 | 99 |
| 18 | Y | 200 | | | 2 | 99 |
| 19 | Q | 200 | | | 1 | 95 |
| 20 | AL | 100 | | | 1 | 55 |
| 21 | AL | 200 | | | 1 | 90 |
| 22 | AL | 50 | | | 2 | 60 |
| 23 | AL | 100 | | | 2 | 90 |
| 24 | AL | 200 | | | 2 | 97 |
| 25 | AM | 200 | | | 1 | 65 |
| 26 | AM | 200 | | | 2 | 95 |
| 27 | R | 60 | | | 2 | 65 |
| 28 | R | 90 | | | 2 | 95 |
| 29 | R | 112 | | | 1 | 55 |
| 30 | R | 112 | | | 2 | 95 |
| 31 | R | 112 | | | 3 | 98–99 |
| 32 | R | 112 | I | 50 | 1 | 60 |
| 33 | R | 112 | I | 50 | 2 | 95 |
| 34 | R | 112 | I | 50 | 3 | 98 |
| 35 | R | 135 | | | 1 | 65 |
| 36 | R | 135 | | | 2 | 98 |
| 37 | R | 135 | | | 3 | 99 |
| 38 | R | 135 | I | 50 | 1 | 70 |
| 39 | R | 135 | I | 50 | 2 | 97 |
| 40 | R | 135 | I | 50 | 3 | 99 |
| 41 | R | 157 | | | 1 | 75 |
| 42 | R | 157 | | | 2 | 99 |
| 43 | R | 157 | | | 3 | 100 |
| 44 | R | 157 | I | 50 | 1 | 80 |
| 45 | R | 157 | I | 50 | 2 | 99 |
| 46 | R | 157 | I | 50 | 3 | 100 |
| 47 | R | 180 | | | 1 | 90 |
| 48 | R | 180 | | | 2 | 99 |
| 49 | R | 180 | | | 3 | 100 |
| 50 | R | 180 | I | 50 | 1 | 90 |
| 51 | R | 180 | I | 50 | 2 | 99 |
| 52 | R | 180 | I | 50 | 3 | 100 |
| 53 | R | 200 | II | 50 | 2 | 100 |
| 54 | R | 150 | II | 50 | 1 | 99 |
| 55 | R | 150 | II | 50 | 2 | 100 |
| 56 | R | 150 | III | 50 | 1 | >99 |
| 57 | R | 150 | III | 50 | 2 | 100 |
| 58 | R | 210 | | | 1 | 95 |
| 59 | R | 210 | | | 2 | 100 |
| 60 | Q | 160 | | | 1 | 95 |
| 61 | Q | 160 | | | 2 | 98 |
| 62 | L | 200 | I | 50 | 2 | 90 |
| 63 | B | 100 | IV | 100 | 1 | 97 |
| 64 | B | 100 | IV | 100 | 2 | 98–99 |
| 65 | V | 125 | | | 1 | 80 |
| 66 | V | 125 | | | 2 | 98 |
| 67 | V | 125 | | | 3 | 99 |
| 68 | V | 125 | III | 17.5 | 1 | 95 |
| 69 | V | 125 | III | 17.5 | 2 | 98 |
| 70 | V | 125 | III | 17.5 | 3 | 98–99 |
| 71 | V | 150 | | | 1 | 80 |
| 72 | V | 150 | | | 2 | 98 |
| 73 | V | 150 | | | 3 | 99 |
| 74 | V | 150 | III | 17.5 | 1 | 96 |

TABLE—Continued

| Example No. | Polyglycolether | Amount, g./l. | Second addition | Amount, g./l. | Time of dry heat treatment, min. | Stripping effect, percent |
|---|---|---|---|---|---|---|
| 75 | V | 150 | III | 17.5 | 2 | 99 |
| 76 | V | 150 | III | 17.5 | 3 | 99 |
| 77 | V | 175 | | | 1 | 95 |
| 78 | V | 175 | | | 2 | >99 |
| 79 | V | 175 | | | 3 | >99 |
| 80 | V | 175 | III | 17.5 | 1 | 97 |
| 81 | V | 175 | III | 17.5 | 2 | 99 |
| 82 | V | 175 | III | 17.5 | 3 | 99 |
| 83 | V | 200 | | | 1 | 96 |
| 84 | V | 200 | | | 2 | 100 |
| 85 | V | 200 | | | 3 | 100 |
| 86 | V | 200 | III | 17.5 | 1 | 98 |
| 87 | V | 200 | III | 17.5 | 2 | 99 |
| 88 | V | 200 | III | 17.5 | 3 | 100 |
| 89 | V | 225 | | | 1 | 99 |
| 90 | V | 225 | | | 2 | 100 |
| 91 | V | 250 | | | 1 | 99 |
| 92 | V | 250 | | | 2 | 100 |
| 93 | V | 275 | | | 1 | 100 |
| 94 | V | 275 | | | 2 | 100 |
| 95 | V | 300 | | | 1 | 100 |
| 96 | V | 300 | | | 2 | 100 |
| 97 | V | 150 | III | 50 | 1 | 99 |
| 98 | V | 150 | III | 50 | 2 | 100 |
| 99 | S | 200 | | | 1 | 99 |
| 100 | S | 200 | | | 2 | 100 |
| 101 | T | 200 | | | 1 | 80 |
| 102 | T | 200 | | | 2 | 100 |
| 103 | V | 150 | V | 50 | 2 | 99 |
| 104 | V | 150 | IV | 50 | 2 | 99 |
| 105 | AN | 200 | | | 2 | 95 |
| 106 | AO | 200 | | | 2 | 95 |

The polyglycol ethers (A)(K), (A)(L), (A)(M), (A)(N) and (A)(O) have the following formulae:

oleic acid + 10C$_2$H$_4$O = (A)(K)
oleyl amine + 8C$_2$H$_4$O = (A)(L)
3-stearylaminopropylamine + 90C$_2$H$_4$O = (A)(M)
3-arachinylaminopropylamine + 95C$_2$H$_4$O = (A)(N)
3-behenylaminopropylamine + 100C$_2$H$_4$O = (A)(O)

The following surface active compounds (termed "Second Addition" in the Table) are used in mixture with a polyglycol ether:

(I) sodium dinaphthylmethanedisulphonate
(II) sodium dodecylbenzenesulphonate
(III) sodium dibutylnaphthalenesulphonate
(IV) tridecyl-(OC$_2$H$_4$)$_8$—O—CH$_2$—COONa
(V) polyethylene glycol, molecular weight 300
(VI) polyethylene glycol, molecular weight 600

In (II) the dodecyl radical is branched. In (IV) "tridecyl" represents the radical of tetramethylnonanol obtained by oxosynthesis from tetrapropylene.

EXAMPLE 107

A polyester fabric dyed with 1% of dye (24) is padded with a solution of 125 g./l. of the polyglycol ether (W), expressed to contain 70% of its weight of liquor, treated for 2 minutes at 200° C., rinsed with hot and cold water and dried. The dyeing is stripped to 98%. When the polyglycol ether concentration is increased to 200 g./l., the stripping effect amounts to 100%.

A dyeing of the yellow dye (11) is stripped to 100% with 125 g./l. of the polyglycol ether (W).

Dyeings produced with dye mixtures, e.g. a brown dyeing produced with a mixture of 66% of dye (3), 17% of dye (29) and 17% of dye (25) or a black dyeing produced with a mixture of 6 parts of dye (6), 2 parts of dye (27) and 1 part of dye (3) are very effectively stripped to 98–99% using 200 g./l. of the polyglycol ether (W).

Having thus disclosed the invention what I claim is:

1. A process for stripping disperse dye which is not fibre-reactive from dyed hydropholic fibre containing the disperse dye, which process comprises contacting the dyed fibre at a temperature above 90° C. with an aqueous solution consisting essentially of water and at least 0.5 percent by weight, based on the weight of the dyed fibre, of no-ionic polyglycol ether compound which has a water-solubility of at least 3 percent at 20° C. and which contains one hydrophobic radical having from 12 to 26 carbon atoms per polyglycol ether chain of from 5 to 120 alkylene oxide groups, each alkylene oxide group having from 2 to 4 carbon atoms.

2. A process according to claim 1 wherein the percentage by weight is from 0.5 to 40 percent by weight, based on the weight of the dyed fibre, of the polyglycolether compound.

3. A process according to claim 1 wherein the polyglycolether compound is adduct of from 20 to 60 moles of ethylene oxide on 1 mole of oleyl alcohol.

4. A process according to claim 1 wherein the polyglycolether compound is adduct of from 8 to 50 moles of ethylene oxide on 1 mole of oleic acid.

5. A process according to claim 1 wherein the polyglycolether compound is adduct of from 25 to 200 moles of ethylene oxide on 1 mole of castor oil.

6. A process according to claim 1 wherein the polyglycolether compound is in admixture with a salt of an aromatic sulfonic acid.

7. A process according to claim 1 wherein the polyglycolether compound is in admixture with condensate of
(a) non-ionic polyglycol ether having a water-solubility of at least 3 percent at 20° C. and containing one hydrophobic radical with from 12 to 26 carbon atoms per polyglycol ether chain of from 5 to 100 alkylene oxide groups, each alkylene oxide group having from 2 to 4 carbon atoms; with
(b) salt of an acid selected from the group consisting of halogenoacetic acid, β-halogenopropionic acid and acrylic acid.

8. A process according to claim 1 wherein the polyglycolether compound is in admixture with condensate of ethylene glycol with 3 to 14 moles of ethylene oxide.

9. A process according to claim 1 wherein the contacting is effected for at least one minute at temperatures of from 180° C. to 230° C.

10. A process according to claim 1 wherein the contacting is effected in a long bath under pressure for at least 10 minutes at a temperature within the range of from 120° to 140° C.

11. A process according to claim 1 wherein the contacting is effected in a long bath for at least 30 minutes at a temperature within the range of from 90° to 100° C.

12. A process according to claim 1 wherein the polyglycolether compound is in admixture with an alkali metal or ammonium salt of an aromatic sulfonic acid.

13. A process according to claim 2 wherein the percentage by weight is from 1.0 to 35 percent by weight, based on the weight of the dyed fibre, of the polyglycolether compound.

14. A process according to claim 6 wherein the aromatic sulfonic acid is a member selected from the group consisting of alkylbenzenesulfonic acid, alkylnaphthalenesulfonic acid and dinaphthylmethanedisulfonic acid.

References Cited
UNITED STATES PATENTS

| | | | |
|---|---|---|---|
| 2,042,194 | 5/1936 | Schoeller | 8—102 |
| 3,093,438 | 6/1963 | Hofer | 8—102X |
| 3,313,590 | 4/1967 | Delano et al. | 8—164X |
| 3,410,648 | 11/1968 | Mautner et al. | 8—102X |

MAYER WEINBLATT, Primary Examiner

U.S. Cl. X.R.

8—69, 164

UNITED STATES PATENT OFFICE
CERTIFICATE OF CORRECTION

Patent No. 3,582,255          Dated June 1, 1971

Inventor(s) BRUNO KISSLING

It is certified that error appears in the above-identified patent and that said Letters Patent are hereby corrected as shown below:

Column 1, line 43, "(1960)," should read --(1960);--; line 56, "cellulose" should read --cellulosic--; line 66, "styrl" should read --, styryl--; line 67, "series" should read --series,--; last line, "yellow)" should read --(yellow)--. Column 2, line 1, "cyanethyl-N-β" should read --cyanethyl-N-β- --; line 4, "1-'" should read --1'--; line 8, "β-acetoxyethyl)" should read --(β-acetoxyethyl)--. Column 3, line 34, "-O-" should read -- -(O- --; line 37, "octylpenyl" should read --octylphenyl--. Column 5, line 67, "(A)" should read --(A),--. Column 7, line 5, "(A)(A)" should read --AA--; line 6, "(A)(B)" should read --AB--; line 7, "(A)(C)" should read --AC--; line 8, "(A)(D)" should read --AD--; line 9, "(A)(E)" should read --AE--; line 16, "(A)(F)" should read --AF--; line 17, "(A)(G)" should read --AG--; line 22, "(A)(H)" should read --AH--; line 23, "(A)(I)" should read --AI--. Column 8, in the table, Example 33, "1" should read --2--. Column 9, line 30, "(A)(K), (A)(L), (A)(M)," should read --AK, AL, AM,--; line 31, "(A)(N) and (A)(O)" should read --AN and AO--; line 32, "(A)(K)" should read --AK--; line 33, "(A)(L)" should read --AL--; line 34, "(A)(M)" should read --AM--; line 35, "(A)(N)" should read --AN--; line 36, "(A)(O)" should read --AO--; claim 1, line 2, "hydropholic" should read --hydrophobic--; line 7, "no-ionic" should read --non-ionic--.

Signed and sealed this 7th day of May 1974.

(SEAL)
Attest:

EDWARD M.FLETCHER,JR.          C. MARSHALL DANN
Attesting Officer              Commissioner of Patents